US012407137B2

(12) United States Patent
Gingrich, III et al.

(10) Patent No.: US 12,407,137 B2
(45) Date of Patent: Sep. 2, 2025

(54) GROUND SHIELDS POSITIONED BETWEEN COLUMNS OF CONTACTS

(71) Applicant: TE Connectivity Solutions GmbH, Schaffhausen (CH)

(72) Inventors: Charles Raymond Gingrich, III, Mechanicsburg, PA (US); Rutger Wilhelmus Smink, Hamont-Achel (BE); Jacobus Nicolaas Tuin, Best (NL); Scott Eric Walton, Mount Joy, PA (US); Keith Edwin Miller, Manheim, PA (US)

(73) Assignee: TE Connectivity Solutions GmbH (CH)

( * ) Notice: Subject to any disclaimer, the term of this patent is extended or adjusted under 35 U.S.C. 154(b) by 426 days.

(21) Appl. No.: 18/050,576

(22) Filed: Oct. 28, 2022

(65) Prior Publication Data

US 2024/0145995 A1 May 2, 2024

(51) Int. Cl.
*H01R 13/6471* (2011.01)
*H01R 12/72* (2011.01)
*H01R 13/6588* (2011.01)

(52) U.S. Cl.
CPC ....... *H01R 13/6471* (2013.01); *H01R 12/724* (2013.01); *H01R 13/6588* (2013.01)

(58) Field of Classification Search
CPC .............. H01R 13/646; H01R 13/6461; H01R 13/6471; H01R 13/6581; H01R 13/6582; H01R 13/6588; H01R 12/724; H01R 12/722; H01R 12/72; H01R 12/71
USPC ..................................................... 439/607.05
See application file for complete search history.

(56) References Cited

U.S. PATENT DOCUMENTS

| | | | | |
|---|---|---|---|---|
| 10,003,144 | B1 | 6/2018 | Sharf | |
| 10,993,314 | B2 | 4/2021 | Charbonneau et al. | |
| 10,998,678 | B1 | 5/2021 | Miller et al. | |
| 11,025,014 | B1 | 6/2021 | Miller et al. | |
| 11,316,307 | B2 * | 4/2022 | Chen | H01R 13/6461 |
| 11,695,239 | B2 * | 7/2023 | Zhu | H01R 13/6582 439/108 |
| 11,870,172 | B2 * | 1/2024 | Xue | H01R 12/7088 |
| 11,923,630 | B2 * | 3/2024 | Hsiao | H01R 12/716 |
| 2018/0083392 | A1 | 3/2018 | Trout et al. | |
| 2021/0296826 | A1 | 9/2021 | Wu et al. | |

OTHER PUBLICATIONS

European Extended Search Report, App. No. 23206252-1201 International Filing Date Jul. 21, 2023.

* cited by examiner

*Primary Examiner* — Phuong K Dinh

(57) ABSTRACT

An electrical connector which controls cross talk and signal radiation. The electrical connector includes columns of contacts having signal contacts and ground contacts. Ground shields are positioned between the columns of contacts. The ground shields have planar members with mating ends and mounting ends. The planar members have surfaces which are configured to be electrically coupled to ground members on a mating connector. Voids are provided in the planar members. Mounting members extend from the mounting ends of the planar members. The mounting members are configured to cooperate with the ground contacts provided in the columns of contacts.

17 Claims, 8 Drawing Sheets

GROUND SHIELDS POSITIONED BETWEEN COLUMNS OF CONTACTS

FIELD OF THE INVENTION

The present invention relates to ground shields positioned between columns of contacts to reduce crosstalk for improved signal integrity. The ground connection with the ground shields can be made through direct physical contact, through capacitive coupling or through both.

BACKGROUND OF THE INVENTION

Due to the increasing complexity of electronic components, it is desirable to fit more components in less space on a circuit board or other substrate. Consequently, the spacing between electrical terminals within connectors has been reduced, while the number of electrical terminals housed in the connectors has increased, thereby increasing the need in the electrical arts for electrical connectors that are capable of handling higher and higher speeds and to do so with greater and greater pin densities. It is desirable for such connectors to have not only reasonably constant impedance levels, but also acceptable levels of impedance and crosstalk, as well as other acceptable electrical and mechanical characteristics. Therefore, there remains a need to provide appropriate shielding to preserve signal integrity and to minimize crosstalk as speeds of signals increase and the footprint of the connector remains the same or decreases.

It would, therefore, be beneficial to provide a connector ground shields positioned between columns of contacts, and in particular between signal pairs of contacts, to optimize shielding and reduce crosstalk for improved signal integrity. It would also be beneficial if the ground connection with the ground shields could be made through direct physical contact, capacitive coupling or both.

SUMMARY OF THE INVENTION

An embodiment is directed to an electrical connector which controls cross talk and signal radiation. The electrical connector includes columns of contacts having signal contacts and ground contacts. Ground shields are positioned between the columns of contacts. The ground shields have planar members with mating ends and mounting ends. The planar members have surfaces which are configured to be electrically coupled to ground members on a mating connector. Voids are provided in the planar members. Mounting members extend from the mounting ends of the planar members. The mounting members are configured to cooperate with the ground contacts provided in the columns of contacts.

An embodiment is directed to an electrical connector with spaced columns of contacts. Each respective row of the columns of contacts have signal contacts and ground contacts. Ground shields are positioned between the columns of contacts. The ground shields have planar members having mating ends and mounting ends. The planar members have surfaces which are configured to be electrically coupled to ground members on a mating connector. Voids are provided in the planar members. Mounting members extend from the mounting ends of the planar members. The mounting members have contact receiving openings through which the ground contacts extend. The mounting members are positioned in line with the voids of the planar members.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
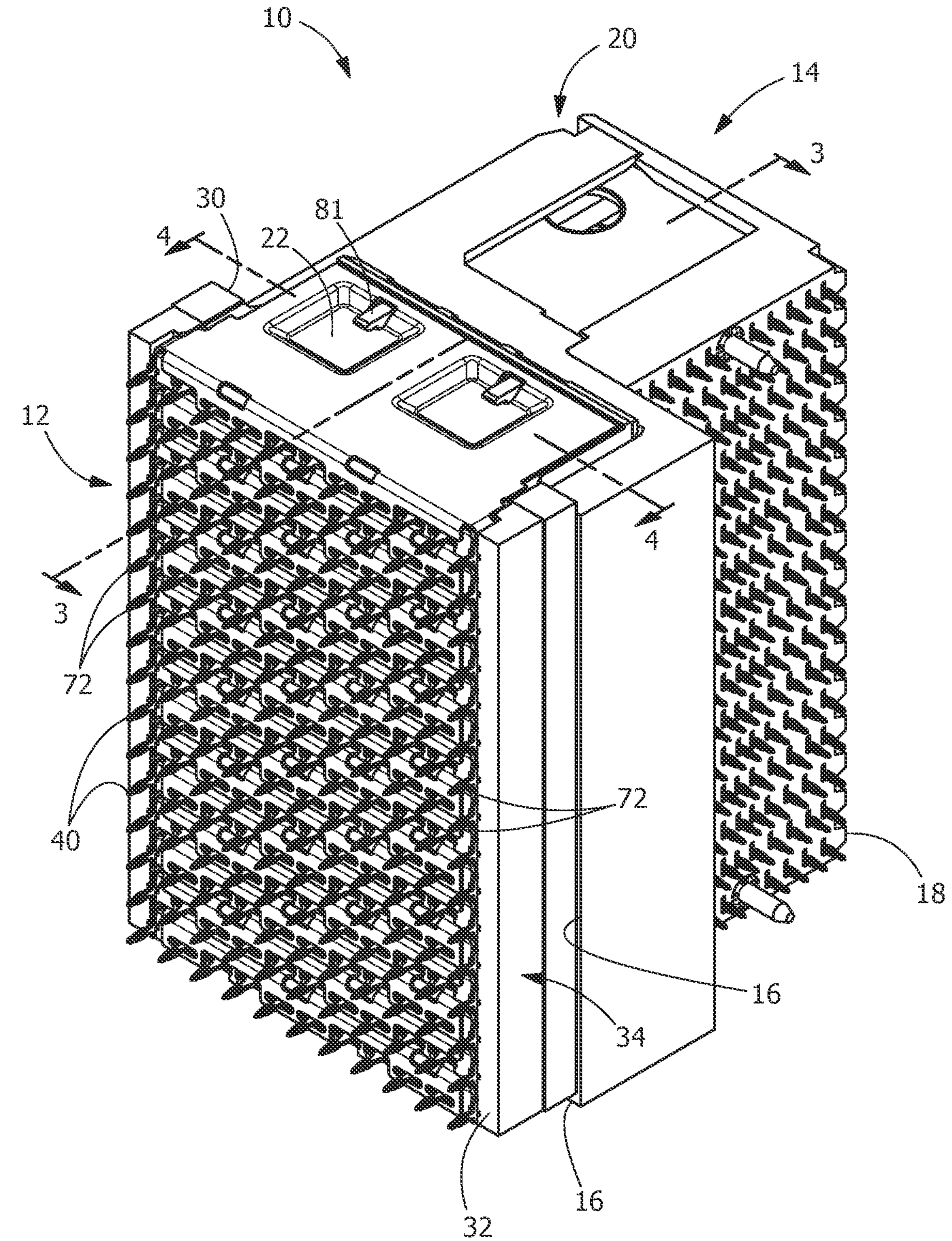
FIG. 1 is a bottom, front perspective view of an illustrative connector system shown in an assembled position, with a backplane connector mated to a mating daughtercard connector.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

FIG. 1 illustrates an illustrative electrical connector system 10 having a backplane connector 12 and a daughtercard connector 14 that are used to electrically connect a backplane circuit board (not shown) and a daughtercard circuit board (not shown). While the electrical connector system 10 is described herein with reference to backplane connectors 12 and daughtercard connectors 14, it is realized that the subject matter herein may be utilized with different types of electrical connectors other than a backplane connector or a daughtercard connector. The backplane connector 12, and the daughtercard connector 14 are merely illustrative of an electrical connector system 10.

In the illustrative embodiment shown, the daughtercard connector 14 constitutes a right angle connector wherein a mating interface 16 and mounting interface 18 of the daughtercard connector 14 are oriented perpendicular to one another. The daughtercard connector 14 is mounted to the daughtercard circuit board at the mounting interface 18. Other orientations of the interfaces 16, 18 are possible in alternative embodiments.

Figure 4:
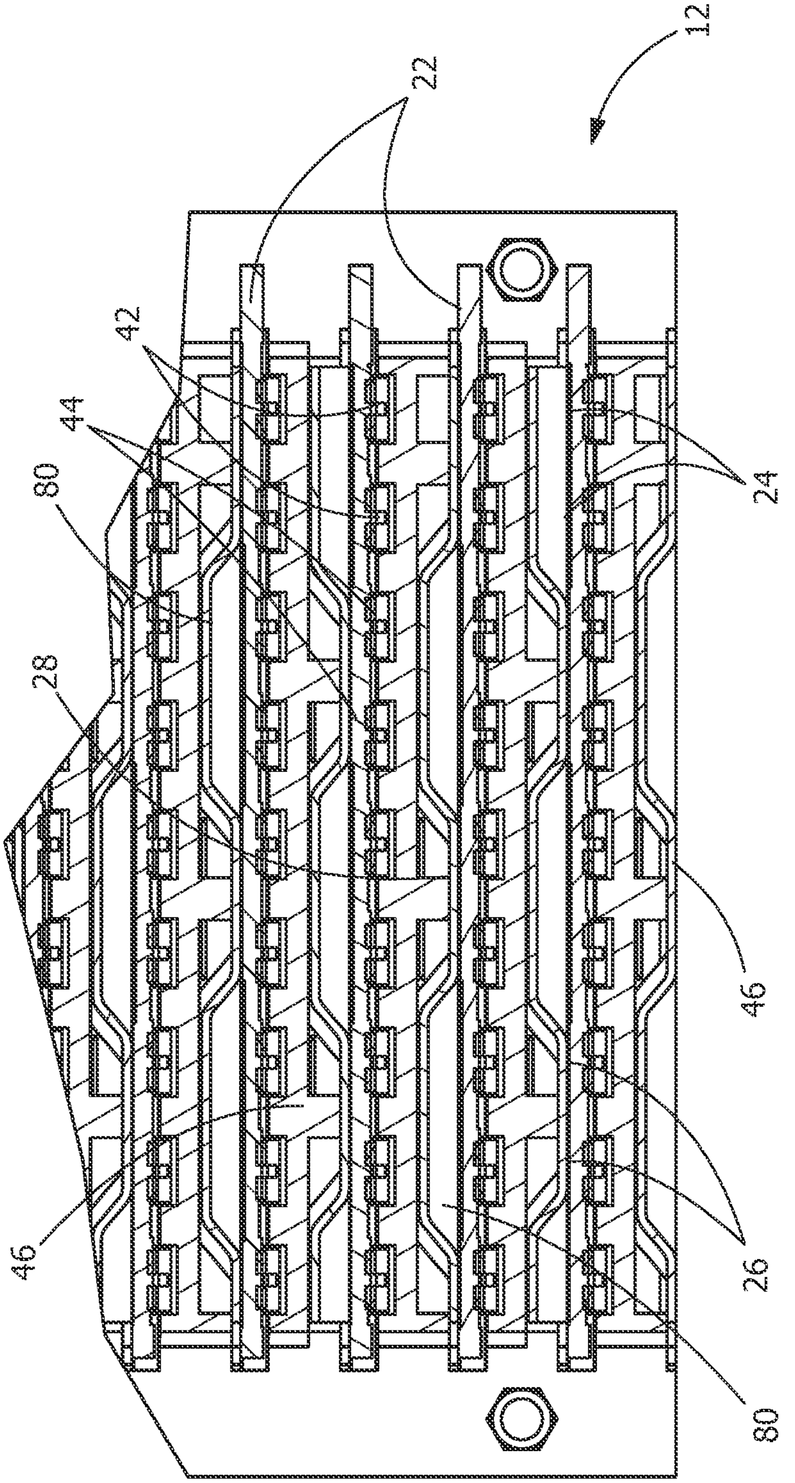
FIG. 4 is an enlarged cross-sectional view of the daughtercard connector mated with the backplane connector, taken along line 4-4 of FIG. 1.

The daughtercard connector 14 includes a housing 20, made of one or more components, holding a plurality of circuit boards 22 therein. The circuit boards 22 have pairs of individual signal pathways or traces (not shown) that extend between the mating interface 16 and the mounting interface 18. The signal traces have signal conductive pads 24 (FIG. 4) provided proximate the mating interface 16. The circuit boards 22 have individual ground pathways or traces (not shown) that extend between the mating interface 16 and the mounting interface 18. The ground traces have ground conductive pads 26 (FIG. 4) provided proximate the mating interface 16. The circuit boards 22 also have ground pathways or traces 28 (FIG. 1) on opposites sides of the circuit boards 22 from the ground traces. The ground traces 28 extend between the mating interface 16 and the mounting interface 18. In alternative embodiments, the circuit boards 22 may be contact modules, the signal traces may be mating signal contacts and the ground traces may be ground contacts.

In the illustrated embodiment, the backplane connector 12 constitutes a header connector mounted to the backplane circuit board. However, other types of connectors may be used. When the backplane connector 12 is mated to the daughtercard connector 14, the daughtercard circuit board is oriented generally perpendicular with respect to the backplane circuit board.

Figure 2:
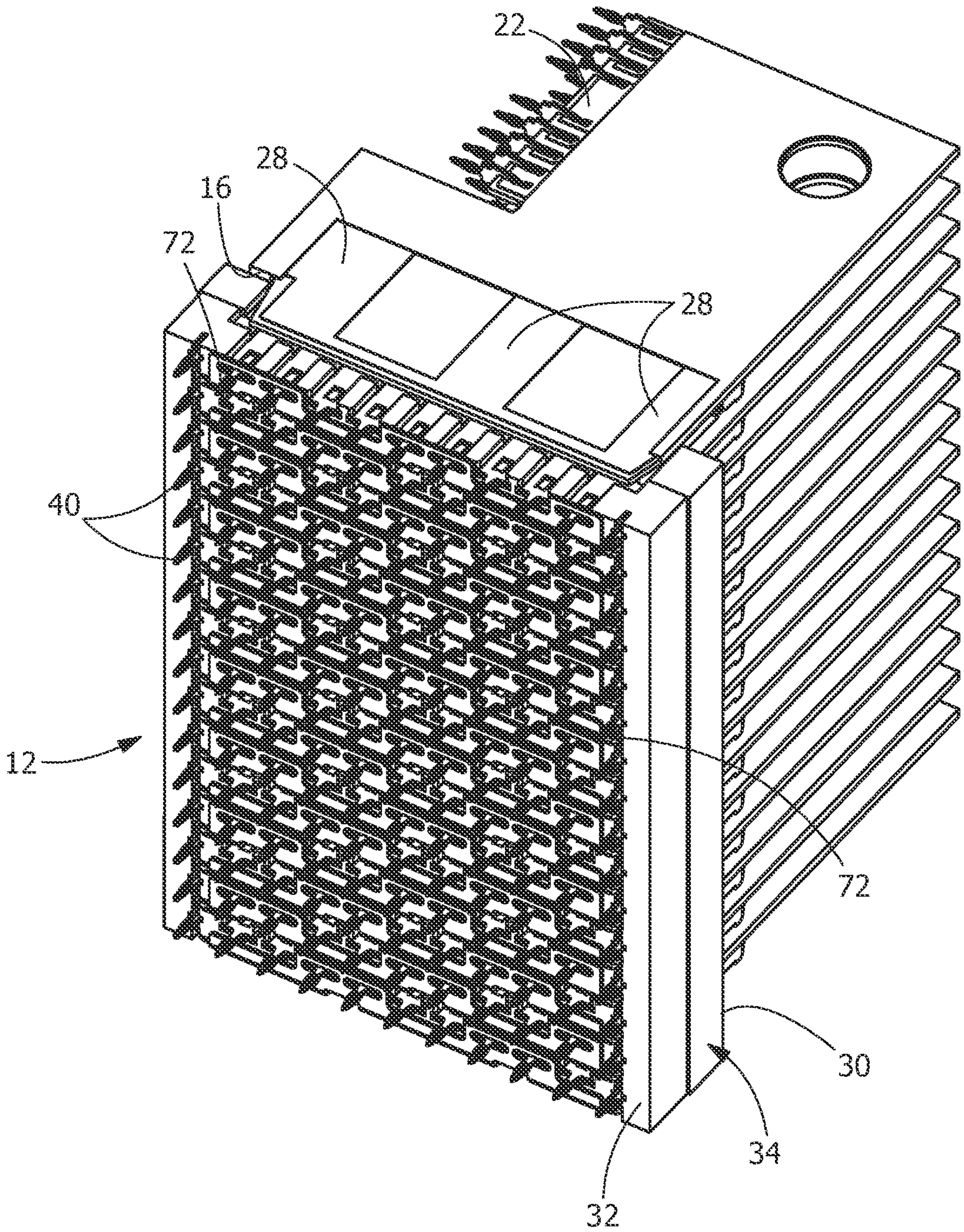
FIG. 2 is a bottom, back perspective view of an the illustrative first backplane connector of FIG. 1.
Figure 3:
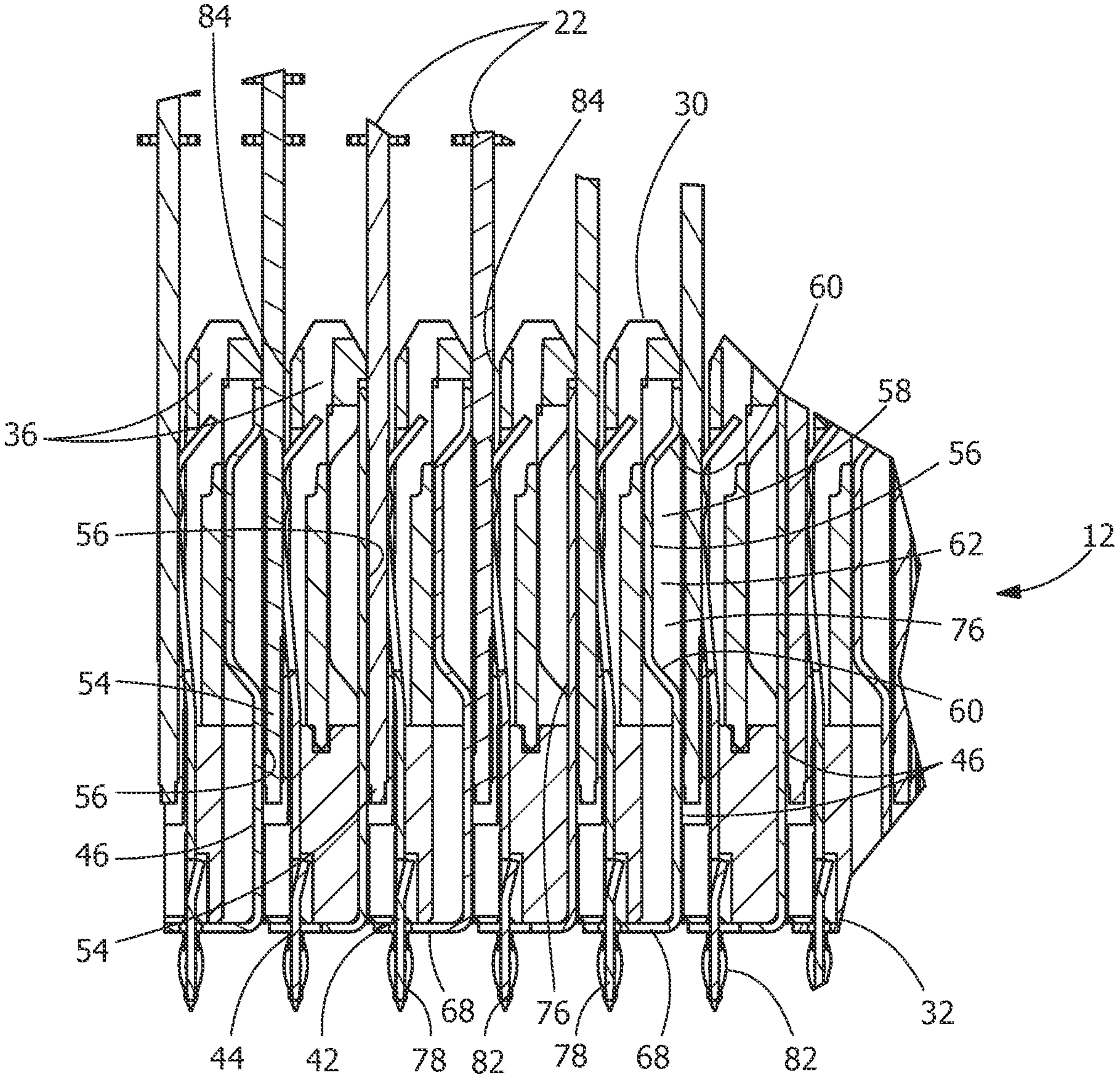
FIG. 3 is an enlarged cross-sectional view of the daughtercard connector mated with the backplane connector, taken along line 3-3 of FIG. 1.

As is shown in FIG. 2, the backplane connector 12 includes a mating end 30 and a mounting end 32 that are oriented generally parallel to one another. The backplane connector 12 is mounted to the backplane circuit board at the mounting end 32. Other orientations of the mating end 30 and the mounting end 32 are possible in alternative embodiments.

The backplane connector 12 includes a one piece housing 34. Alternatively, the housing may include a plurality of individual housings or modules. The housing 34 holds a at least one row of contacts 40, which include signal contacts 42 and ground contacts 44.

The signal contacts 42 extend between the mating end 30 and the mounting end 32. In the exemplary embodiment, the signal contacts 42 are arranged in pairs carrying differential signals. However, in other configurations, the signal contacts 42 may not be arranged in pairs for carrying differential signals.

The ground contacts 44 extend between the mating end 30 and the mounting end 32. In the illustrative embodiment shown, the ground contacts 44 are electrically connected to ground shields or plates 46 that extend between the mating end 30 and the mounting end 32.

Figure 5:
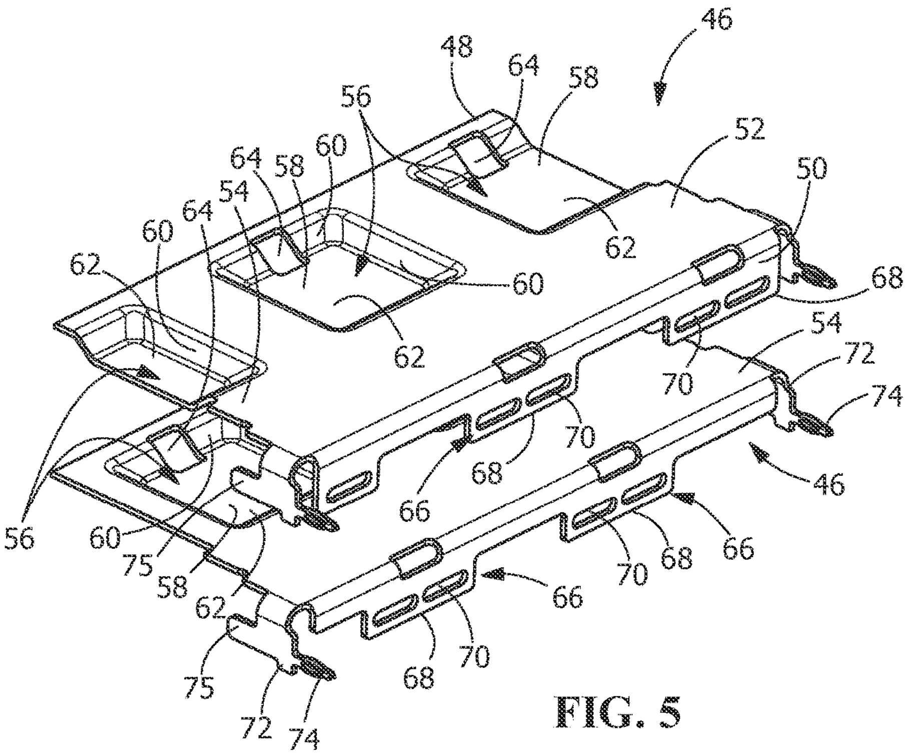
FIG. 5 is a perspective view of two ground planes or shields of FIG. 1.

In the illustrative embodiment shown in FIGS. 1 through 5, the ground shields or plates 46 are positioned or stitched between the columns of contacts 40. As shown in FIG. 5, the ground shields 46 have mating ends 48 and mounting ends 50. The mating ends 50 are positioned proximate the mating end 30 of the connector 12 and the mounting ends 52 are positioned proximate the mounting end 32 of the connector 12. The ground shields 46 are formed of conductive material, such as, but not limited to, metal or plated plastic.

As shown in FIG. 5, the ground shields 46 have planar members 52 with surfaces 54. The surfaces 54 are configured to engage the ground pathways or traces 28 on the backside of the circuit boards 22. Voids 56 are provided in the planar members 54. In the illustrative embodiment shown, the voids 56 are raised portions 58 with transition sections 60 and bottom surfaces 62. The transition sections 60 extend at an angle between the planar surfaces 52 and the bottom surfaces 62. The bottom surfaces 62 extend in a plane which is removed and parallel to the plane of the planar members 52. In the embodiment shown, the raised portions 58 are embossed from the planar members 52. However, other configurations of the raised portions 58 may be used.

Securing openings 64 extend through the transition sections 60 of the raised portions 58. The securing openings 64 are positioned proximate to the mating ends 48 of the ground shields 46.

Mounting members 66 extend from the mounting ends 50 of the ground shields 46. The mounting members 66 have ground contact engagement portions 68 which extend approximately perpendicular to the plane of the planar members 52. The ground contact engagement portions 68 have openings 70 for receiving the ground contacts 44 therethrough.

In the illustrative embodiment shown in FIGS. 1 through 5, ground contacts 72 are provided at the ends of the planar members 52. The ground contacts 72 provide additional ground connections between the ground shields 46 and the backplane (not shown). The ground contacts 72 extend approximately perpendicular to the plane of the planar members 52 and have securing portions 74 which extend from the mounting end 50. In the embodiment shown, the securing portions 74 are eye of the needle compliant members, but other types of securing portions 74 may be used. Retention tabs 75 may also be provided on the ground contacts 72. The retention tabs 75 cooperate with the housing 34 of the backplane connector 12 to secure the ground shields 46 in position.

When the ground shields 46 are properly inserted into ground shield receiving slots 76 (FIG. 3) of the backplane connector 12, the raised portions 58 of a respective ground shield 46 is positioned in line with the ground contacts 44 of an adjacent row of contacts 40. Consequently, the bottom surfaces 62 of the raised portions 58 are spaced from, and do not engage, the signal contacts 42. The ground contacts 44 and the ground shields 46 peripherally surround pairs of signal contacts 42 to provide electrical shielding for the pairs of signal contacts 42. Gaps or spaces, which could allow EMI leakage between pairs of signal contacts 42, are minimized through or between the ground contacts 44 and the ground shields 46.

When the ground shields 46 are properly inserted into ground shield receiving slots 76 of the backplane connector 12, the openings 70 of the ground contact engagement portions 68 of the mounting members 66 are positioned about mounting portions 78 of the ground contacts 44. The ground contacts 44 and the planar members 52 and the raised portions 54 of the ground shields 46 form cavities 80 (FIG. 3) around pairs of signal contacts 42. The cavities 80 may have any shape depending on the shapes of the ground contacts 44 and the planar members 52 and the raised portions 54 of the ground shields 46.

The ground shields 46 are retained in position in the ground shield receiving slots 76 of the backplane connector 12 by retention projections 81 of the backplane connector 12. As shown in FIG. 1, the retention projections 81 extend through the securing openings 64 to properly position and retain the ground shields 46 in the ground shield receiving slots 76. In addition, the retention tabs 75 cooperate with the housing 34 of the backplane connector 12 to secure the ground shields 46 in position.

Upon positioning the backplane connector 12 on the backplane, mounting portions 82 of the signal contacts 42 and the mounting portions 78 of the ground contacts 44 are positioned in openings of the backplane. As the contact engagement portions 68 of the mounting members 66 are positioned about mounting portions 78 of the ground contacts 44, the contact engagement portions 68 are electrically coupled to the ground traces of the backplane.

Upon mating of the daughtercard connector 14 to the backplane connector 12, the circuit boards 22 of the daughter card connector 14 are positioned in circuit board receiving slots 84 of the backplane connector 12. In this position, the signal contacts 42 physically and electrically engage the signal conductive pads 24 of the signal traces of the circuit boards 22. The ground contacts 44 are also placed in physical and electrical engagement with the ground conductive pads 26 of the ground traces of the circuit boards 22. In addition, the surfaces 54 of the ground shields 46 are electrically coupled to the ground traces 28 of the circuit boards 22.

When fully assembled, the contact engagement portions 68 are electrically coupled to the ground traces of the backplane and the surfaces 54 of the ground shields 46 are electrically coupled to the ground traces 28 of the circuit boards 22, thereby providing an electrical pathway from the circuit boards 22, across the ground shields 46 to the backplane. Due to the configuration of the components, the electrical coupling may occur due to physical contact, capacitive coupling or both.

In various embodiments, the contact engagement portions 68 are in physical contact with the ground traces of the backplane, thereby allowing the ground current to flow across the physical contact points. Similarly, the surfaces 54 of the ground shields 46 are in physical contact with the ground traces 28 of the circuit boards 22, thereby allowing the ground current to flow across the physical contact points.

In other embodiments, the contact engagement portions 68 may be proximate to, but physically separated from the ground traces of the backplane due to tolerances, warpage or other factors. Similarly, the surfaces 54 of the ground shields 46 may be proximate to, but physically separated from the ground traces 28 of the circuit boards 22 due to tolerances, warpage or other factors. In these instances, the surface areas of either of the contact engagement portions 68 and the ground traces of the backplane or the surfaces 54 of the ground shields 46 and the ground traces 28 of the circuit boards 22 are of sufficient size to allow the ground current to flow across by capacitive coupling, with no physical contact. In so doing, the ground shield 46 and the copper in the daughter card or backplane short together to make electrical contact at high frequencies.

If connections from the ground shield 46 to both the daughter card and the backplane are made by capacitive coupling, the ground shield 46 would be considered a floating ground. The capacitive coupling can occur through air, solder mask or through metal to metal connections with little or no normal force.

With the connector 12 properly assembled, the ground contacts 44 and the ground shields 46 extend about the periphery of the pairs of signal contacts 42 and surround the pairs of signal contacts 42 to provide electrical shielding for the pairs of signal contacts 42 and to control cross talk, signal radiation, impedance or other electrical characteristics.

Figure 6:
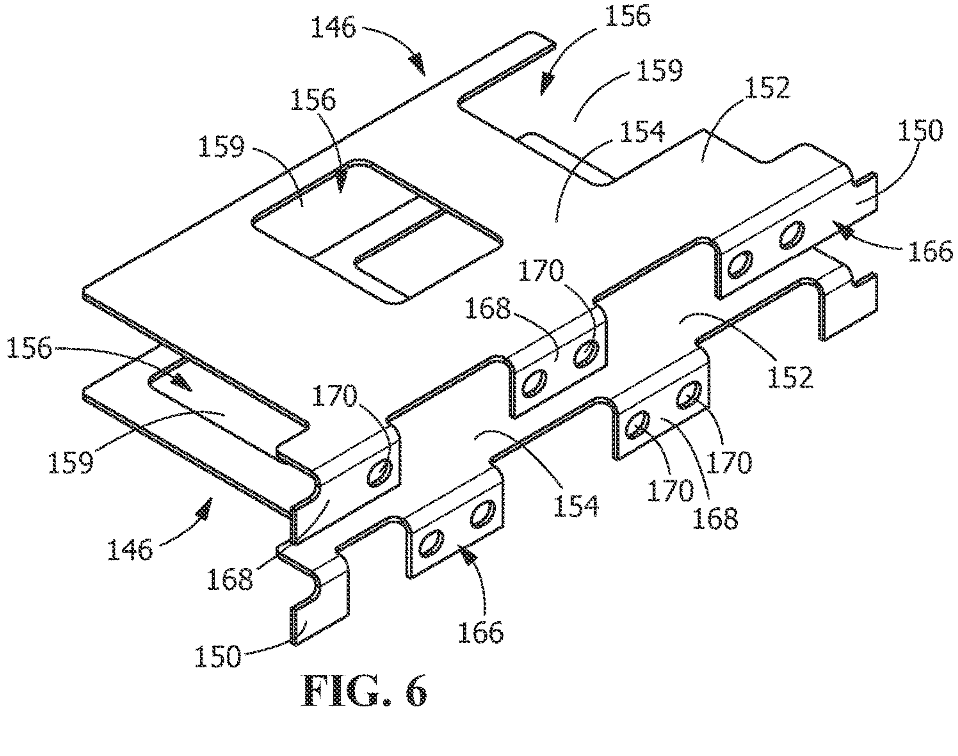
FIG. 6 is a perspective view of two ground planes or shields of an illustrative alternate second backplane connector.
Figure 7:
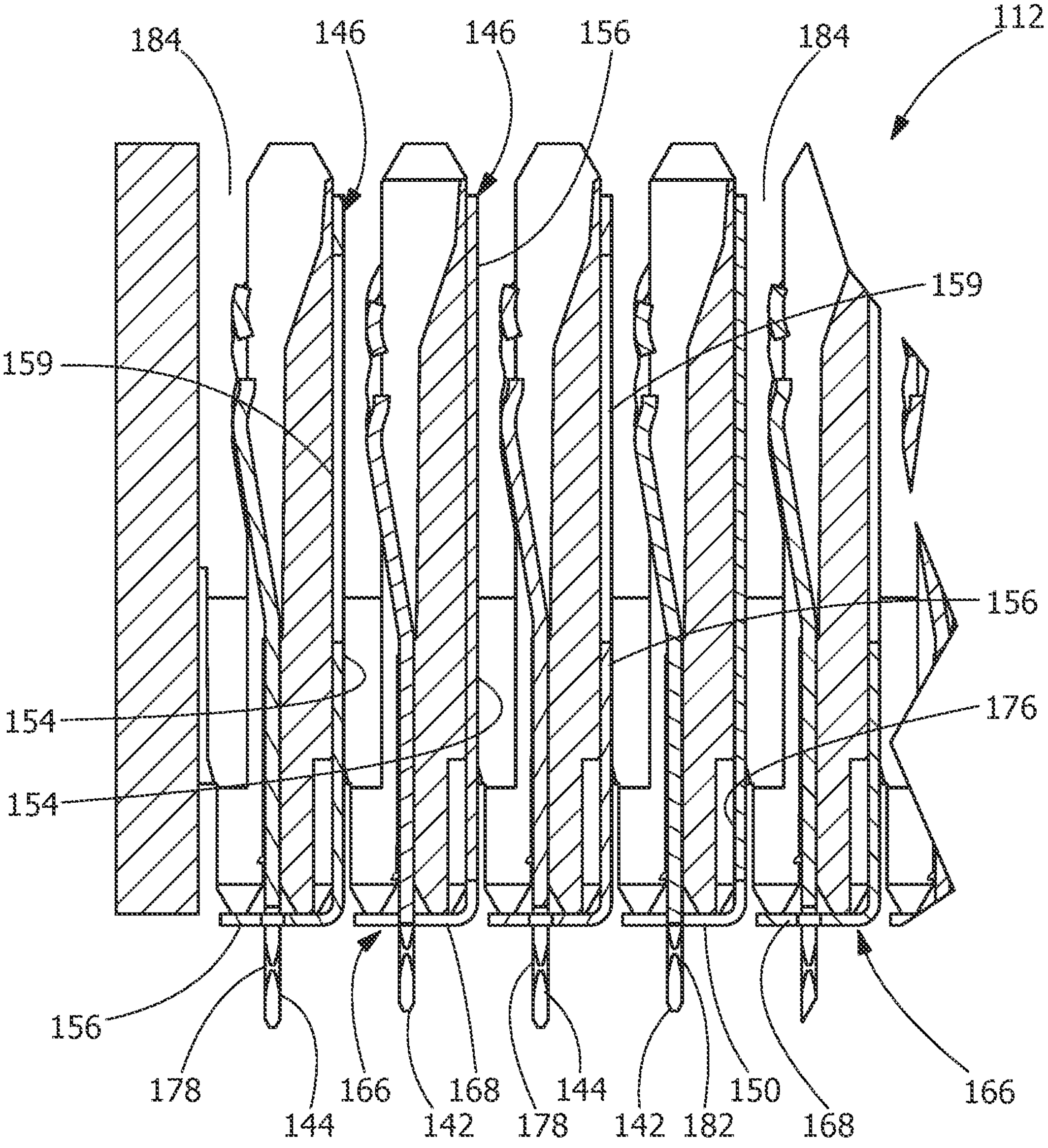
FIG. 7 is an enlarged cross-sectional view of a daughtercard connector mated with the second backplane connector, with an orientation similar to that of FIG. 3.
Figure 8:
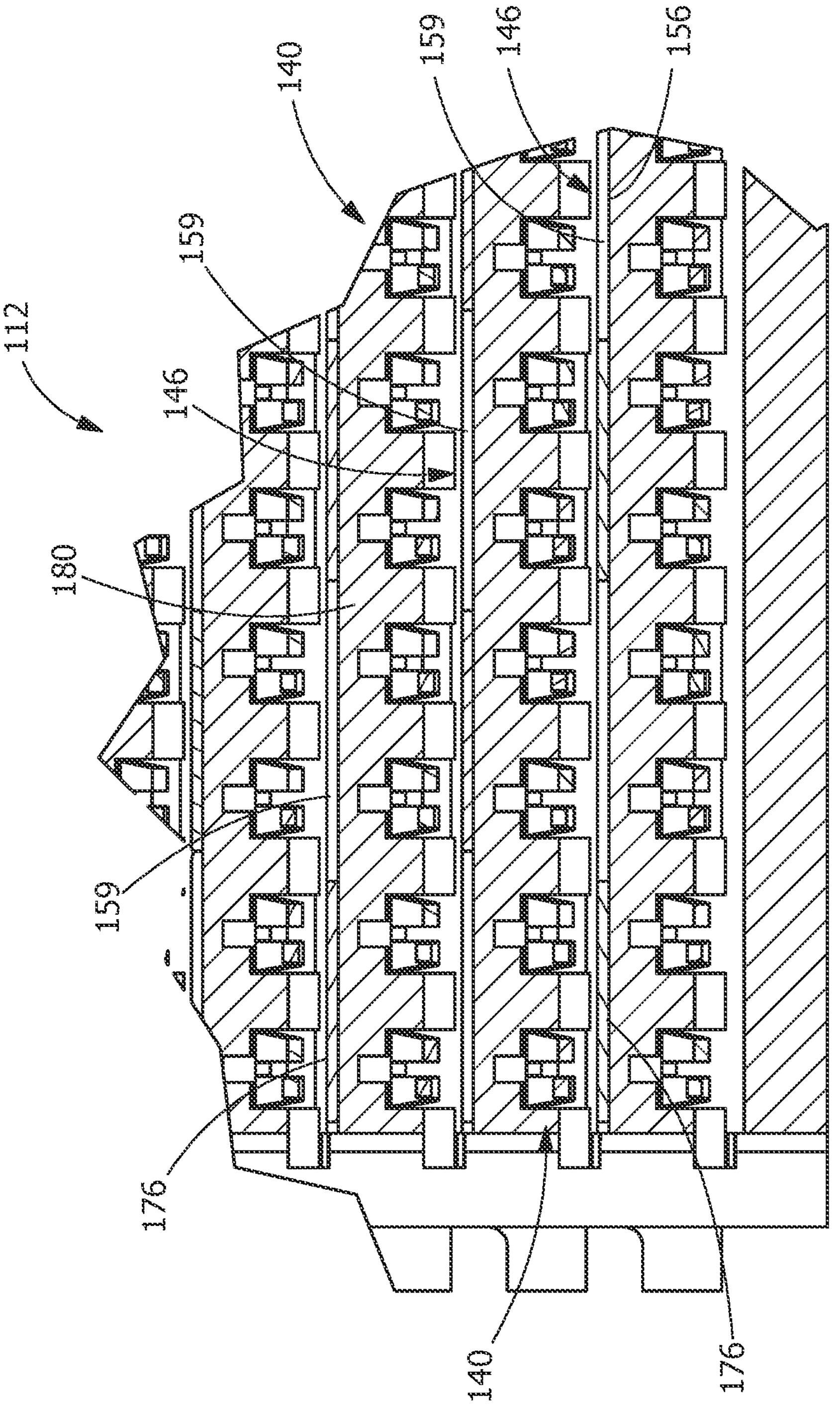
FIG. 8 is an enlarged cross-sectional view of the daughtercard connector mated with the second backplane connector, with an orientation similar to that of FIG. 4.

FIGS. 6 through 8 illustrate an alternate grounding shield 146. The ground shields or plates 146 are positioned or stitched between the columns of contacts 140. The ground shields 146 are formed of conductive material, such as, but not limited to, metal or plated plastic.

The ground shields 146 have planar members 152 with surfaces 154. The surfaces 154 are configured to engage the ground pathways or traces 28 on the backside of the circuit boards 22. Voids 156 are provided in the planar members 154. In the illustrative embodiment shown, the voids 156 are windows or openings 159. In the embodiment shown, the openings 159 are stamped from the planar members 152. However, other configurations of the openings 159 may be used.

Mounting members 166 extend from the mounting ends 150 of the ground shields 146. The mounting members 166 have ground contact engagement portions 168 which extend approximately perpendicular to the plane of the planar members 152. The ground contact engagement portions 168 have openings 170 for receiving the ground contacts 144 therethrough.

When the ground shields 146 are properly inserted into ground shield receiving slots 176 of the backplane connector 112, the openings 159 of a respective ground shield 146 is positioned in line with the ground contacts 144 of an adjacent row of contacts 140. The ground contacts 144 and the ground shields 146 peripherally surround pairs of signal contacts 142 to provide electrical shielding for the pairs of signal contacts 142. Gaps or spaces, which could allow EMI leakage between pairs of signal contacts 142, are minimized through or between the ground contacts 144 and the ground shields 146.

When the ground shields 146 are properly inserted into ground shield receiving slots 176 of the backplane connector 112, the openings 170 of the ground contact engagement portions 168 of the mounting members 166 are positioned about mounting portions 178 of the ground contacts 144. The ground contacts 144 and the planar members 152 and the openings 159 of the ground shields 146 form cavities 180 (FIG. 7) around pairs of signal contacts 142.

Upon positioning the backplane connector 112 on the backplane, mounting portions 182 of the signal contacts 142 and the mounting portions 178 of the ground contacts 144 are positioned in openings of the backplane. As the contact engagement portions 168 of the mounting members 166 are positioned about mounting portions 178 of the ground contacts 144, the contact engagement portions 168 are electrically coupled to the ground traces of the backplane.

Upon mating of the daughtercard connector 14 to the backplane connector 112, the circuit boards 22 of the daughter card connector 14 are positioned in circuit board receiving slots 184 of the backplane connector 112. In this position, the signal contacts 142 physically and electrically engage the signal conductive pads 24 of the signal traces of the circuit boards 22. The ground contacts 144 are also placed in physical and electrical engagement with the ground conductive pads 26 of the ground traces of the circuit boards 122. In addition, the surfaces 154 of the ground shields 146 are electrically coupled to the ground traces 128 of the circuit boards 122.

When fully assembled, the contact engagement portions 168 are electrically coupled to the ground traces of the backplane and the surfaces 154 of the ground shields 146 are electrically coupled to the ground traces 28 of the circuit boards 122, thereby providing an electrical pathway from the circuit boards 122, across the ground shields 146 to the backplane. Due to the configuration of the components, the electrical coupling may occur due to physical contact, capacitive coupling or both.

In various embodiments, the contact engagement portions 168 are in physical contact with the ground traces of the backplane, thereby allowing the ground current to flow across the physical contact points. Similarly, the surfaces 154 of the ground shields 146 are in physical contact with the ground traces 128 of the circuit boards 122, thereby allowing the ground current to flow across the physical contact points.

In other embodiments, the contact engagement portions 168 may be proximate to, but physically separated from the ground traces of the backplane due to tolerances, warpage or other factors. Similarly, the surfaces 154 of the ground shields 146 may be proximate to, but physically separated from the ground traces 28 of the circuit boards 22 due to tolerances, warpage or other factors. In these instances, the surface areas of either of the contact engagement portions 168 and the ground traces of the backplane or the surfaces 154 of the ground shields 146 and the ground traces 28 of the circuit boards 22 are of sufficient size to allow the ground current to flow across by capacitive coupling, with no physical contact. In so doing, the ground shield 146 and the copper in the daughter card or backplane short together to make electrical contact at high frequencies.

If connections from the ground shield 146 to both the daughter card and the backplane are made by capacitive coupling, the ground shield 146 would be considered a floating ground. The capacitive coupling can occur through air, solder mask or through metal to metal connections with little or no normal force.

With the connector 112 properly assembled, the ground contacts 144 and the ground shields 146 extend about the periphery of the pairs of signal contacts 142 and surround the pairs of signal contacts 142 to provide electrical shielding for the pairs of signal contacts 142 and to control cross talk, signal radiation, impedance or other electrical characteristics.

Figure 9:
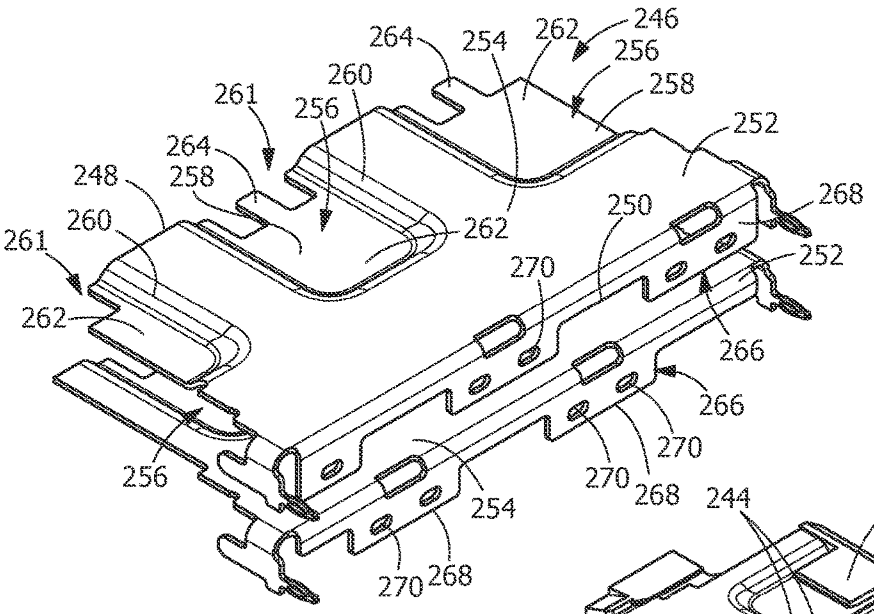
FIG. 9 is a perspective view of two ground planes or shields of an illustrative alternate third backplane connector.
Figure 10:
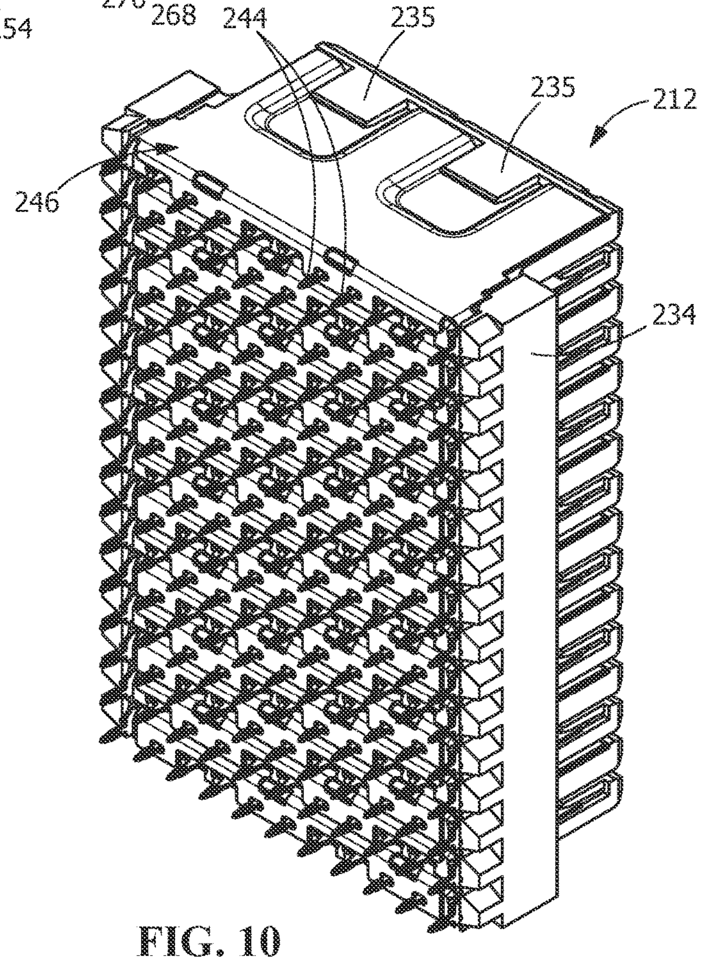
FIG. 10 is a bottom, back perspective view of an the illustrative third backplane connector of FIG. 9.

FIGS. 9 and 10 illustrate another alternate grounding shield 246. Ground shields 246 are similar to ground shields 46, with the exception of the configuration of the voids 256 or raised portions 258. The ground shields 246 have planar members 252 with surfaces 254. The voids 256 or raised portions 258 have transition sections 260 and bottom surfaces 262. The transition sections 260 extend at an angle between the planar surfaces 252 and the bottom surfaces 262. The transition sections 260 are provided on three sides. Open sides 261 are provide proximate the mating ends 248 of the grounding shields 246 The bottom surfaces 262 extend in a plane which is removed and parallel to the plane of the planar members 252. In the embodiment shown, the raised portions 258 are embossed from the planar members 252. However, other configurations of the raised portions 258 may be used.

The open sides have securing projections 264 which extend from the bottom surfaces 262. The securing projections 264 engage securing members 235 of the housing 234 of the backplane connector 212 to retain the grounding shield 246 in position.

Mounting members 266 extend from the mounting ends 250 of the ground shields 246. The mounting members 266 have ground contact engagement portions 268 which extend approximately perpendicular to the plane of the planar members 252. The ground contact engagement portions 268 have openings 270 for receiving the ground contacts 244 therethrough.

The operation and function of the grounding shield 246 is similar to the described for the ground shield 46.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector which controls cross talk and signal radiation, the electrical connector comprising:
- a housing having a mating end and an oppositely facing mounting end, the mating end extending parallel to the mounting end;
- columns of contacts having signal contacts and ground contacts extending from proximate the mating end through the oppositely facing mounting end;
- ground shields positioned between the columns of contacts, the ground shields contacts extending from proximate the mating end through the oppositely facing mounting end, the ground shields comprising:
  - planar members having mating ends provided proximate the mating end of the housing and mounting ends provided proximate the oppositely facing mounting end of the housing, the planar members having surfaces which are configured to be electrically coupled to ground members on a mating connector;
  - voids provided in the planar members; and
  - mounting members extending from the mounting ends of the planar members, the mounting members having contact engagement portions configured to cooperate with the ground contacts provided in the columns of contacts, the mounting members positioned in line with the voids of the planar members.

2. The electrical connector as recited in claim 1, wherein the voids in the planar members are raised portions with bottom surfaces positioned in a second plane which is removed from and parallel to a first plane of the planar members.

3. The electrical connector as recited in claim 2, wherein a transition sections extend between the planar members and the bottom surfaces of the raised portions.

4. The electrical connector as recited in claim 3, wherein the raised portions are embossed from the planar members.

5. The electrical connector as recited in claim 3, wherein securing openings extend through the raised portions, the securing openings receiving securing projections which extend from the housing of the electrical connector.

6. The electrical connector as recited in claim 1, wherein the voids in the planar members are openings in the planar members.

7. The electrical connector as recited in claim 1, wherein the planar members are electrically coupled to the ground members on the mating connector by direct physical contact.

8. The electrical connector as recited in claim 1, wherein the planar members are electrically coupled to the ground members on the mating connector by capacitive coupling.

9. The electrical connector as recited in claim 1, wherein the mounting members are approximately perpendicular to the planar members.

10. The electrical connector as recited in claim 9, wherein the mounting members have contact receiving openings through which the ground contacts extend.

11. The electrical connector as recited in claim 9, wherein the mounting members are electrically coupled to a mating circuit board by direct physical contact.

12. The electrical connector as recited in claim 9, wherein the mounting members are electrically coupled to a mating circuit board by capacitive coupling.

13. The electrical connector as recited in claim 1, wherein edge ground contacts extend from the planar members.

14. The electrical connector as recited in claim 13, wherein the edge ground contacts are approximately perpendicular to the planar members.

15. The electrical connector as recited in claim 14, wherein the edge ground contacts have deformable mounting portions which are configured to be positioned in through holes of a mating circuit board.

16. The electrical connector as recited in claim 15, wherein the edge ground contacts have retention tabs which extend in an opposite direction as the deformable mounting portions.

17. The electrical connector as recited in claim 1, wherein the ground contacts and the ground shields peripherally surround pairs of the signal contacts to provide electrical shielding for the pairs of the signal contacts.

* * * * *